April 7, 1964     G. LEUNIG ETAL     3,127,878
INTERNAL COMBUSTION ENGINE OPERATING WITH SELF-IGNITION
Filed Oct. 31, 1960     4 Sheets-Sheet 1

INVENTORS
GÜNTHER LEUNIG
JEAN HERBERT WILLICH

BY *Pierce, Scheffler & Parker*
ATTORNEYS

INVENTORS
GÜNTHER LEUNIG
JEAN HERBERT WILLICH

BY Pierce, Schyffler & Parker
ATTORNEYS

April 7, 1964 G. LEUNIG ETAL 3,127,878
INTERNAL COMBUSTION ENGINE OPERATING WITH SELF-IGNITION
Filed Oct. 31, 1960 4 Sheets-Sheet 3
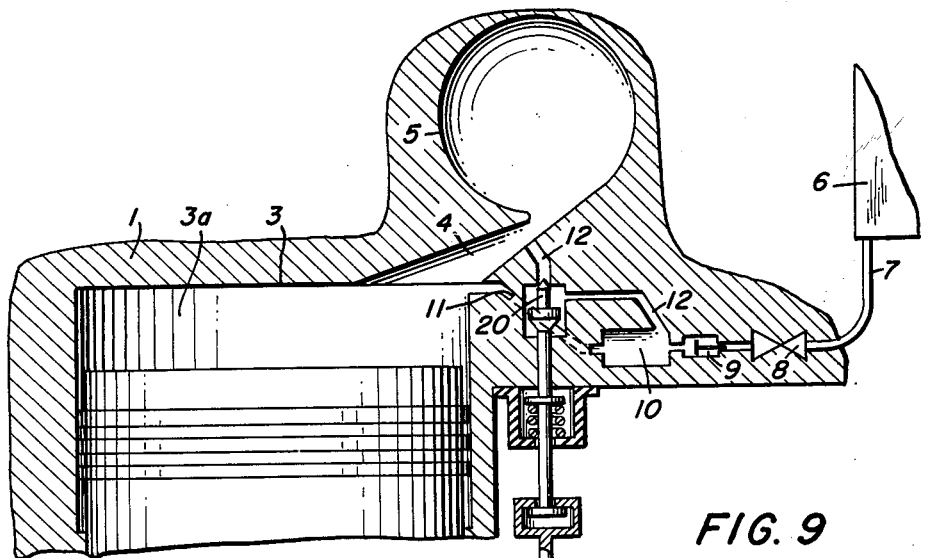
FIG. 9
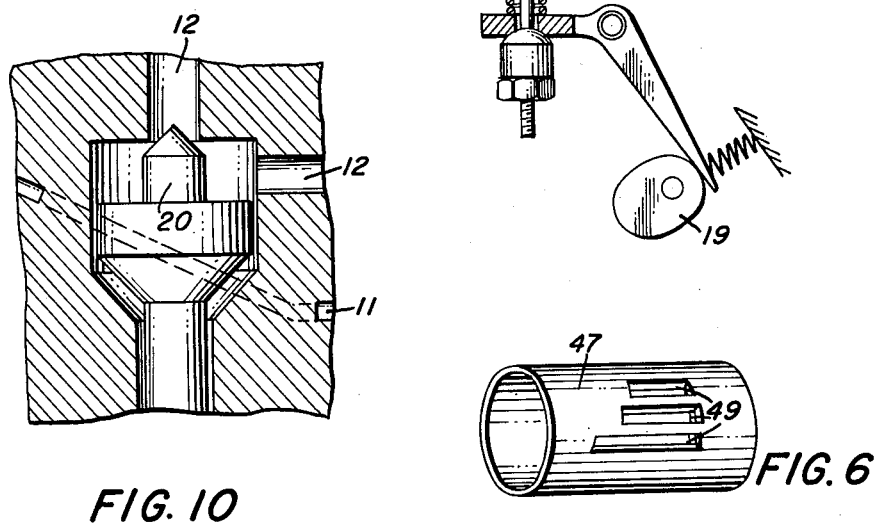
FIG. 10
FIG. 6
INVENTORS
GÜNTHER LEUNIG
JEAN HERBERT WILLICH
BY Pierce, Schyffler & Parker
ATTORNEYS

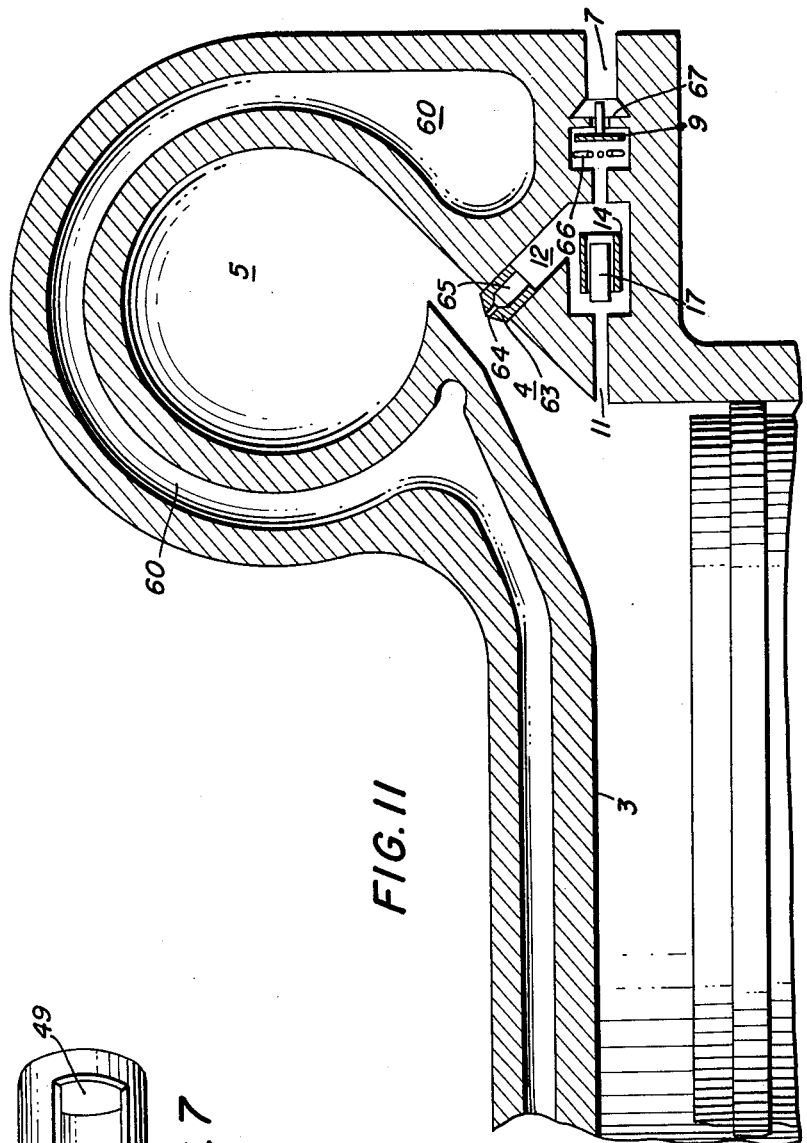
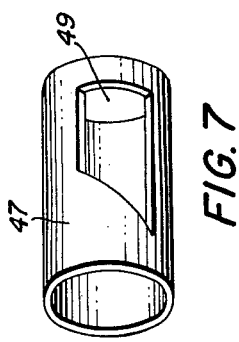

United States Patent Office 3,127,878
Patented Apr. 7, 1964

3,127,878
INTERNAL COMBUSTION ENGINE OPERATING WITH SELF-IGNITION
Günther Leunig, Bad Homburg, and Jean Herbert Willich, Wiesbaden, Germany, assignors to Gesellschaft für Linde's Eismaschinen Aktiengesellschaft, Hollriegelskreuth, near Munich, Germany
Filed Oct. 31, 1960, Ser. No. 66,116
Claims priority, application Germany Nov. 10, 1959
10 Claims. (Cl. 123—32)

This invention relates to improvements in internal combustion engines operating with self-ignition.

In patent application Serial No. 841,395, filed September 21, 1959, entitled "Internal Combustion Engine Operating with Self Ignition," now Patent 3,068,845, issued Dec. 18, 1962, there is disclosed an internal combustion engine operating with self-ignition, wherein the amount of fuel required for an expansion stroke is stored in the vicinity of the combustion chamber before the compression stroke starts, and this stored amount of fuel is sucked in during the compression stroke, from the storage chamber, by way of suitable ducts, by the air flowing from the main combustion chamber into a secondary combustion chamber connected with the latter by a constricted transfer channel, these ducts terminating, on the one hand, in the main combustion chamber above the upper piston-reversing position—hereafter called the "scavenging duct"—and on the other hand, approximately at the narrowest point of the transfer channel, hereafter called the "delivery duct," and that the fuel-air mixture is introduced into the secondary combustion chamber which is uniformly curved on its inner circumference, the transfer channel and the secondary combustion chamber being so designed and dimensioned that in the secondary combustion chamber the mixture obtains a relatively high rotative velocity so that the heavier fuel droplets are thrown onto the wall of the secondary combustion chamber which is so cooled, in known manner, that on the one hand decomposition of the fuel is prevented, while on the other hand evaporation of the fuel is insured.

Engines built according to this idea work very satisfactorily at certain speeds and afford high performances. However, at other speeds within their speed range they develop only moderate torque and consume relatively large amounts of fuel. The reason for this phenomenon is probably a premature introduction of the fuel into the combustion chamber, which is not exactly controlled over the entire speed range, and a correspondingly irregular—mostly premature—ignition. Mass forces have the effect that the phenomenon does not manifest itself at certain speeds.

The above mentioned shortcomings are eliminated, and additional advantages are achieved, if a shut-off element for the fuel storage is arranged between the fuel feed duct and the scavenging duct, which shut-off element closes the scavenging duct during the intake stroke of the piston, allowing the amount of fuel necessary for a cycle to flow from the feed duct into the storage chamber. With this arrangement it is advisable that the shut-off element open the scavenging duct to the storage chamber during the compression stroke of the piston, so that the fuel flows through the delivery duct into the transfer channel. A suitable embodiment of the shut-off element can be actuated by the pressure difference prevailing between the scavenging duct on the one hand and the feed— and delivery—duct on the other hand. An expedient embodiment of the shut-off element in the fuel storage chamber is formed by a guide bush provided with control slots and a control piston sliding in the latter. In order to delay the fuel delivery through the delivery duct into the transfer channel, a flow throttle can be arranged between the storage chamber and the delivery duct. In this embodiment it is advisable and advantageous to provide a constriction, preferably an exchangeable nozzle, approximately where the delivery duct opens into the transfer channel. An arrangement wherein the opening of the delivery duct is inclined in the direction of the secondary combustion chamber also has a favorable effect on the storage and supply of the fuel into the secondary combustion chamber. Inclination of the delivery duct gives emerging fuel a momentum component toward the auxiliary combustion chamber: also, some of the expanding gas flowing from the auxiliary to the main combustion chamber tends to enter the opening of the delivery duct thereby preventing premature suction of fuel through the delivery duct. Positive, and therefore exact, dosing of the injected amount and determination of the point of injection are obtained if a valve is arranged in the delivery duct which valve is actuated by the crank or control shaft of the engine.

It has been found that under certain circumstances it is of advantage if—contrary to the tendency of keeping the scavenging duct free of fuel—particularly during the intake stroke of the piston, a small amount of fuel is allowed to flow into the scavenging duct and into the main combustion chamber. In order to achieve this, it is advisable for the piston control valve, consisting of guide bush and control piston, to be provided with an effective leak, which results in leakiness particularly during the intake stroke of the piston, so that a very small amount of fuel passes over into the scavenging duct. Another embodiment for obtaining this objective is characterized by the fact that the annular chamber 10 around the guide bush for the control piston is connected by way of a pipe with the delivery duct, and that an adjustable throttle valve is arranged in this pipe. Since the fuel supply depends to a considerable extent on the mass forces—particularly, also, on the amount of fuel—it has been found advantageous to arrange the axis of the guide bush approximately in the direction of the smallest amplitude of vibration of the internal combustion engine.

The invention will be described in greater particularity and with reference to the accompanying drawings, in which:

FIGURE 1 diagrammatically represents a cylinder and secondary combustion chamber and fuel supply system of an internal combustion engine in accordance with the generic aspect of the present invention;

Figure 4:
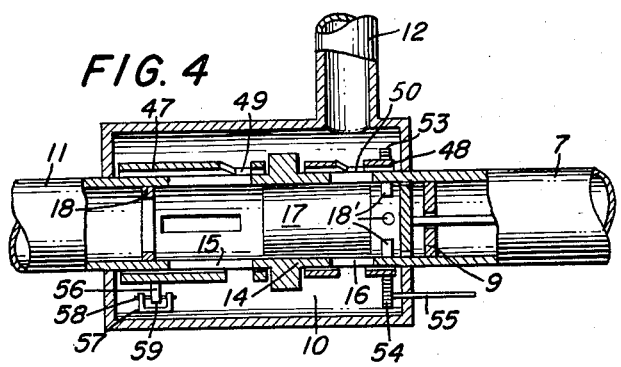
Figure 5:
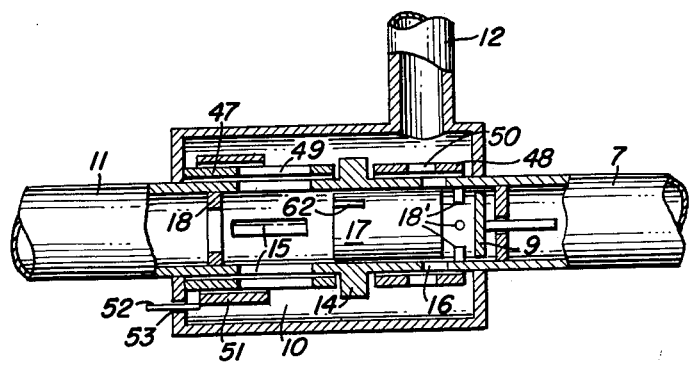
Figure 8:
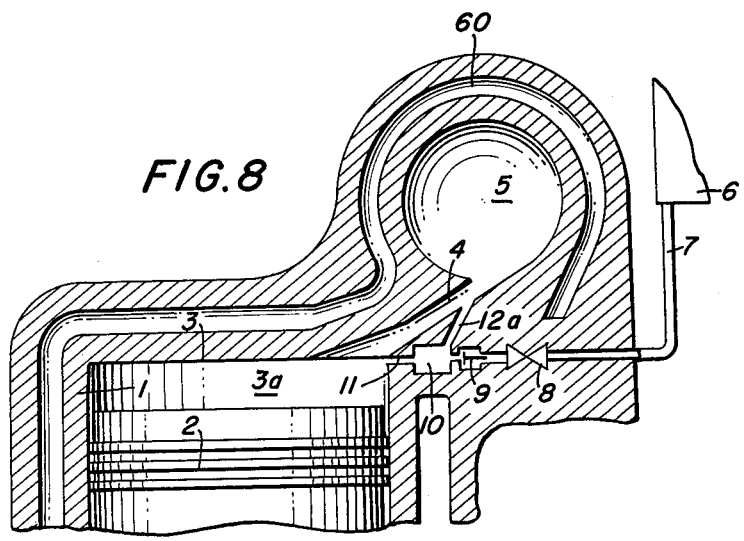

FIGURE 4 and FIGURE 5 are views, partly in section, of modified forms of storage chamber; FIGS. 6 and 7 are perspective views of different modifications of sleeve 47 of FIGS. 4 and 5; FIG. 8 is a modified showing of the delivery duct 12 of FIG. 1; FIG. 9 is a detailed, sectional view showing the valve actuating means for blocking delivery duct 12; FIG. 10 is an enlarged, part-sectional view of the valve head structure, and FIG. 11 is an enlarged sectional view, showing a removable orifice member for providing fuel flow from the delivery duct into the transfer channel.

Figure 1:
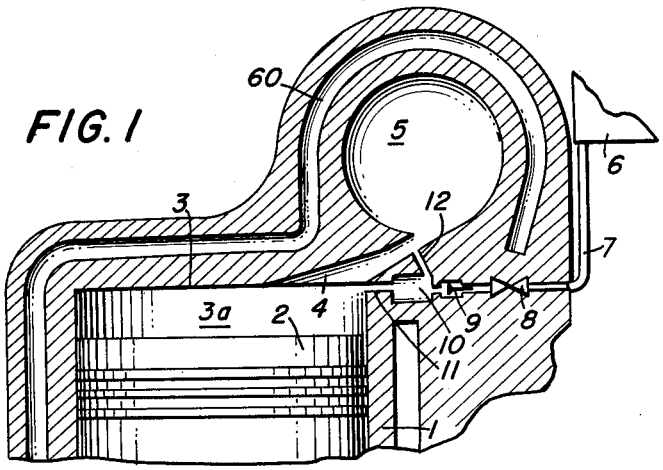

FIGURE 1 shows diagrammatically a section through the combustion chamber of an internal combustion engine with a shut-off element between the fuel feed duct and the scavenging duct according to the invention. In a cylinder 1 moves a reciprocating piston 2 which is shown in a position below the upper dead center. The main combustion chamber 3a between the piston 2 and the cylinder head 3 is connected by means of a transfer-channel 4 to a secondary combustion chamber 5, the transfer-channel 4 being constricted in the direction of combustion chamber 5 and opening tangentially into the latter. From a fuel tank 6 a supply line 7 leads through a throttle valve 8 and a check valve 9 to a fuel storage chamber 10 whose one side is connected by means of a scavenging duct 11 to the main combustion chamber 3a above the upper dead center of the piston and whose other end is connected by means of a delivery duct 12 approximately at the narrowest zone of the transfer channel 4.

In the storage chamber 10 there is arranged a shut-off element, the further details and function of which will be described below with reference to FIGURE 2.

During the suction stroke of the piston 2, fuel streams from the fuel tank 6 through the supply line 7, the throttle valve 8 and the check valve 9 into the storage chamber 10, the scavenging duct 11 then being shut by the shut-off element. During the compression stroke the air, streaming from the main combustion chamber above the piston through the transfer-channel 4 into the secondary combustion chamber 5, creates pressure in scavenging duct 11 thereby displacing fuel out of the storage chamber 10 through the feed duct 12 and then, with formation of a rotating vortex in the secondary combustion chamber 5 through the effect of inertia, throws it partially out against the chamber wall. The transfer-channel 4 and the secondary combustion chamber 5 are so fashioned and dimensioned that the mixture in chamber 5 is accelerated to a comparatively high speed of rotation, so that heavier fuel droplets are thrown out against the secondary combustion chamber wall which is so cooled, by means known per se, that on the one hand there can set in no decomposition of the fuel, whilst on the other hand evaporation of the centrifuged liquid fuel is assured.

Figure 2:
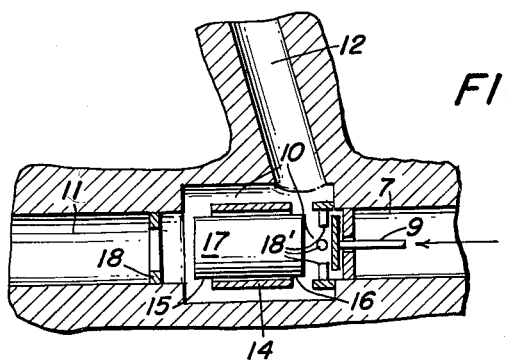
FIGURE 2 is an enlarged sectional view through the storage chamber of the fuel supply system represented generally in FIG. 1.

FIGURE 2 shows schematically the details of the storage chamber according to FIGURE 1. A guide bush 14 is arranged in the storage chamber 10 which guide bush 14 is provided with two rows of control slots 15 and 16. A control piston 17 slides in the guide bush 14. The detailed structure of check valve 9 is illustrated in FIGS. 2, 4 and 5. This is a disc-type valve, whose stem portion has slidable support in the valve seat member (to the right of the valve head, as illustrated in these figures); said valve seat member being provided with sufficient area perforation to admit quantity flow of fuel when the valve is open. Just to the left of the disc head of valve 9 four abutment pins 18 are provided, these pins being spaced 90° about the interior of fuel supply pipe 7. These pins function solely as abutment means for the valve head 9 when this valve opens, on the suction stroke of piston 2; they do not materially interfere with the free flow of fuel from pipe 7 into delivery duct 12.

During the suction stroke of piston 2, the control piston 17 is moved to the left, as viewed in the drawings, against the seat 18. The control slots 15 in the guide bush 14, are covered, while the control slots 16—which usually are smaller than the slots 15—are open, so that a partial vacuum is produced inside the guide bush 14. This partial vacuum is higher than is the under pressure established in the annular chamber 10, in the path over the transfer channel 4 and the delivery duct 12, which latter preferably is constricted at its mouth. Since the pressure in the fuel feed duct 7 is higher than that in the guide bush 14, the check valve 9 opens so that fuel can enter the guide bush 14, filling the latter. Depending on the position of a throttle valve 8 in the fuel feed duct 7, more or less fuel flows into the storage chamber 10.

During the compression stroke of the piston, an over-pressure is produced in the scavenging duct 11, by which the control piston 17 is moved in the direction toward the check valve 9, closing the latter, so that the fuel in the guide bush 14 is displaced through the control slots 16 into the annular chamber 10. During this motion of the control piston the control slots 15 are released, so that a greater amount of air can flow through the scavenging duct 11 and annular chamber 10 into the delivery duct 12, and the fuel now stored in the annular chamber 10 is engaged by this air current and introduced through the delivery duct 12 into the transfer channel 4.

Since each access from the fuel tank 6, and consequently also from the annular chamber 10, is closed at the beginning of the intake stroke of the piston by the control piston 17, any undesired—particularly premature—entrance of fuel into the cylinder is prevented. The fuel supply through the delivery duct can be delayed in the desired manner during the compression stroke by the length, stroke and weight of the control piston 17, by its play in the guide bush 14, and by the position and size of the control slots, so that any premature entrance of fuel into the transfer channel 4 is also prevented. Besides, the volume ratios between the guide bush 14 and the annular chamber 10, are also important for the storage of the fuel. In order to be able to vary the ratios of the fuel storage during the operation in a simple and reliable manner, it is advisable that the position and size of the control slots and the end positions of the control piston 17 be variable, for example, by rotatable and/or telescopic sleeves 47, 48, FIGS. 5–7 which can be controlled from the outside.

Since the storage chamber 10 for the fuel is connected, on the one hand, through the scavenging duct with the main combustion chamber 3a with piston 2 approximately in its upper portion, and on the other hand through the delivery duct 12 approximately at the narrowest cross-section of the transfer channel 4, it is logical to arrange the storage chamber in the part in which the transfer channel 4 is located—that is to say, preferably in the cylinder head of the internal combustion engine. Performance-improving efforts on the internal combustion engine according to the invention can lead to a higher thermal stress of the above mentioned part, so that the stored fuel is exposed under certain circumstances to too high temperatures, caused by heat flow in the material, which in certain cases can lead to the formation of vapor bubbles and in very unfavorable cases to a decomposition of the fuel, so that the course of the combustion process is considerably disturbed. In the latter case it can even result in clogging of the connecting paths, for the introduction of the fuel. It is advisable to arrange the fuel storage chamber in a separate machine part to be secured on the part of the internal combustion engine that contains the transfer channel. This element, which is independent and which can be easily secured on the motor, can be kept at the correct temperature by a cooling system which can be designed in known manner. This also has the advantage that the storage chamber itself and all associated pipes and structural elements are much easier to clean and to service, particularly if the relief valve and the throttle valve are housed in such a group. In order to make the heat flow in this separate machine part as low as possible, it is advisable for the machine part housing the fuel-storage chamber to be connected directly with the part of the internal combustion engine containing the transfer channel, substantially only at the sealing surfaces of assembled parts of the scavenging duct and of the delivery duct. This part is then preferably pressed with a clamping device against the sealing surfaces.

Figure 3:
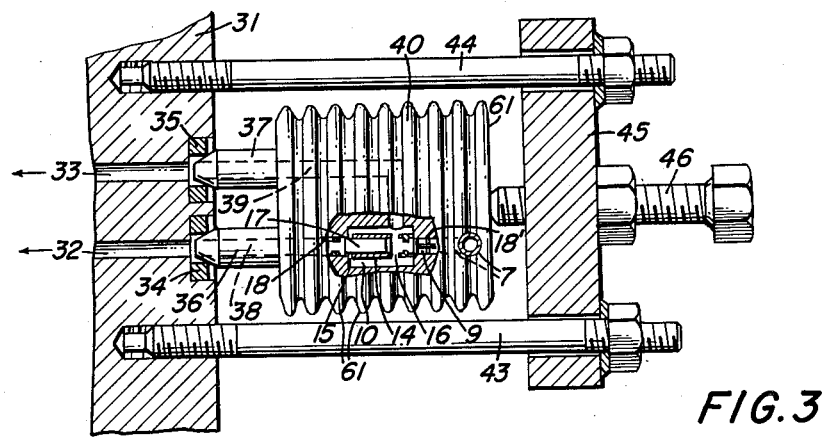
FIGURE 3 is an enlarged sectional view of a housing for the aforesaid fuel storage chamber which housing is separable from the cylinder of the internal combustion engine per se.

In FIGURE 3, the duct 33 corresponds to feed duct 12 of FIG. 1 and duct 32 corresponds to scavenging duct 11.

An embodiment of this concept is shown in FIG. 3. The part 31 of the internal combustion engine houses the transfer channel (not represented). The delivery duct 33 leads approximately to the narrowest point of the transfer channel, while the scavenging duct 32 opens into the main combustion chamber. In the mouths of these ducts are provided gaskets 34 and 35, which bear on conical or calotte-shaped tubular nipples 36 and 37 which contain the extension of the scavenging duct 38 and of the delivery duct 39. They terminate in a block-shaped machine part 40, which houses the storage chamber 10 to which the fuel feed duct leads. FIG. 3 illustrates the check valve 9; control piston 17; guide bush 14, and abutment means 18 and 18′, all shown in greater detail and to enlarged scale in FIGS. 2, 4 and 5. This block 40 is pressed—by means of two screws 43 and 44, the yoke 45, and the set screw 46—against the sealing surfaces of the assembled scavenging delivery-ducts 32, 38 and 33, 39. The relief valves and the throttle valve for the fuel supply are preferably also arranged in the block 40.

The inventive embodiment shown in FIG. 4 is generally similar to that of FIG. 2, and as far as the elements of the storage chamber according to FIG. 4 are identical with the arrangement according to FIG. 2, they have the same reference numbers. Two sleeves 47 and 48 are rotatively arranged on the guide bush 14. Distributed over the circumferences of sleeves 47 and 48 are several slots 49 and 50, respectively, the various slots 49, of which only two are represented, are arranged in the same axial position, and are staggered axially by a certain amount. Likewise, slots 50 are staggered axially. One pair of slots 49 can be made to coincide with one pair of slots 15, the slots 49 being axially shorter than are the slots 15 and the axial extension of the cleared total opening depending on which of the slots 49 coincide with the slots 15. Likewise, one pair of slots 50 can be made to coincide with one pair of slots 16. By turning the sleeves 47 and 48 respectively one can thus select the axial position of the cleared opening. If the various slots 49 or 50 are so arranged side by side that effectively helically terminated breakthrough is formed in the sleeves 47, 48 the axial position of the cleared opening can be constantly changed by turning the sleeves so that not only the axial position, but also the axial extension of the cleared passage is adjustable, if necessary or desirable. FIGS. 6 and 7 illustrate alternative slot arrangements 49 in sleeve 47 of FIGS. 4 and 5, whereby the rotary position of sleeve 47 determines the magnitude of openings 49 which are aligned with slots 15 in guide bush 14. The above described arrangement has, in the subject of the application, a function similar to that of adjustable injection pumps in injection type-diesel engines. Means for turning the sleeves 47 and 48 are shown in FIG. 4.

In FIG. 4 the part 53 is a gear wheel which surrounds the sleeve 48 and which is rigidly connected with the latter. The gear wheel 53 meshes with a gear wheel 54 which is fixed on a shaft 55. The shaft 55 traverses the housing of the preliminary storage chamber and can be turned from the outside, for example, in a simple manner by turning by hand the end protruding from the housing, to which the reference lines lead from the reference number 55. By this rotation the sleeve 48 is also turned by the gear wheel 54 and the gear wheel 53 so that another part of the wide slot 50 comes to lie opposite the slot 16 and the exposed length of the slot 16 is varied. The present drawing FIG. 4 shows the free length of the slot 16 to be fixed and not increased by the turning of the sleeve 48. 56 is a short lever which is fixed on the sleeve 47. The U-shaped member 57 is connected by a pin 58 with the lever 56. The U-shaped member 57 is arranged at the end of a bar 59 which protrudes vertically from the drawing plane and which is displaceable in its longitudinal direction. When the bar 59 is displaced in a longitudinal direction, the sleeve 47 is turned about its axis so that the slot 49 is again staggered with regard to the slots 15 and the uncovered length, that is, the length which is free for the passage of fuel, is varied.

FIGURE 5 represents an organization embodying slots that can be changed by telescopic displacement, FIG. 5 corresponding to FIG. 4 in slightly modified form. In this embodiment, the slots 49 all extend axially over the same distance. Over the sleeve 47 however, there is arranged another sleeve 51 which can be displaced by means of a connecting rod 52. The connecting rod 52 leads out of chamber 10 by means of a stuffing box 53. When the sleeve 51 is displaced axially, the effective opening of the slots 49 is changed. As was previously stated, control piston 17 may be provided with a leakage orifice, as shown at 62 in FIG. 5, permitting leakage of some fuel into the scavening duct during the intake stroke of the piston.

FIG. 9 illustrates, on an enlarged scale and with parts shown in section, a conventional means for operating the shutoff valve in the delivery duct 12. Cam 19 is actuated from the crankshaft of the engine periodically to open valve 20 against its spring bias to closed position, as illustrated. FIG. 10 illustrates the valve head structure of valve 20 on an enlarged scale. FIG. 11, drawn to greatly enlarged scale, is a sectional view showing, in duct 12, the positioning of an interchangeable nozzle member 63 having a nozzle opening 64.

We claim:
1. An internal combustion engine of the self-ignition type, which comprises a cylinder; a reciprocating piston within said cylinder; a main combustion chamber within said cylinder and above said reciprocating piston; a secondary combustion chamber having a uniformly curved wall; a constricted transfer channel leading from said main to said secondary combustion chamber, said transfer channel opening into said secondary combustion chamber tangentially with respect to said curved wall, which latter is adapted to function as a guide surface for a stream of air and fuel blown into said secondary combustion chamber in the course of the movement of said piston towards its upper position and for droplets of liquid fuel centifuged thereon; means for introducing fuel into said transfer channel, said fuel-introducing means consisting essentially of a fuel storage chamber; a fuel feed duct supplying fuel to said fuel storage chamber through a check valve; a fuel delivery duct extending from the fuel storage chamber to the transfer channel and entering the latter at substantially its narrowest zone, and a scavenging duct connecting said fuel storage chamber with said main combustion chamber at a point above the upper piston-reversing position; a cylindrical sleeve in said fuel storage chamber extending between said fuel feed duct and said scavenging duct, ports in said sleeve adjacent each end, and a plunger slidable in said sleeve and tending to close the end of said scavenging duct in consequence of a vacuum obtaining on that side of said plunger, from said main combustion chamber.

2. Internal combustion engine as defined in claim 1, in which the plunger is adapted to effect a partial closing, only, of the scavenging duct, so as to cause a small igniting charge of fuel to enter the main combustion chamber.

3. Internal combustion engine as defined in claim 1, further characterized in that the cylindrical sleeve comprises a guide bushing in which the piston-like plunger slides, said plunger being so arranged that in sliding away from said scavenging duct it forces a part of the fuel through the ports at the other end of said sleeve, into the fuel storage chamber to be carried by the air stream entering the fuel storage chamber from the scavenging duct through the open ports at the corresponding end of said sleeve into the fuel delivery duct, and then into said transfer channel.

4. Internal combustion engine according to claim 1, and adjustable valve sleeves slidable over said ports to vary the size thereof.

5. Internal combustion engine according to claim 1, further characterized in that a flow throttle is provided between the storage chamber and the delivery duct.

6. Internal combustion engine according to claim 1, further characterized in that a constriction, preferably an exchangeable nozzle, is provided at the point where the delivery duct opens into the transfer channel.

7. Internal combustion engine according to claim 1, further characterized in that the discharge part of the delivery duct is inclined relative to the normal on the axis of the transfer channel to discharge toward the secondary combustion chamber.

8. Internal combustion engine according to claim 1, and a cyclically operated valve in said delivery duct to stop the flow therethrough during the engine compression stroke until after ignition temperature has been reached.

9. Internal combustion engine according to claim 1, characterized by the arrangement of the fuel storage chamber in a separate machine part which is secured on the part of the internal combustion engine containing the transfer channel.

10. Internal combustion engine according to claim 9, characterized in that the machine part housing the fuel storage chamber is connected directly with the part of the internal combustion engine containing the transfer channel substantially only at the sealing surfaces of the assembled parts of the scavenging duct and of the delivery-duct.

References Cited in the file of this patent
UNITED STATES PATENTS

| | | |
|---|---|---|
| 2,106,914 | L'Orange | Feb. 1, 1938 |
| 2,783,747 | Layne | Mar. 5, 1957 |

FOREIGN PATENTS

| | | |
|---|---|---|
| 932,999 | Germany | Sept. 15, 1955 |
| 949,014 | Germany | Sept. 13, 1956 |